United States Patent
Sutren

[15] 3,658,378
[45] Apr. 25, 1972

[54] FOLDING HEAD CONTROL DEVICES

[72] Inventor: Claude Sutren, Billancourt, France

[73] Assignees: Regie Nationale des Usines Renault, Billancourt; Automobiles Peugeot, Paris, France

[22] Filed: June 1, 1970

[21] Appl. No.: 42,139

[30] Foreign Application Priority Data

July 7, 1969 France....................................6922958

[52] U.S. Cl. .....................................................296/137 C
[51] Int. Cl. ...........................................................B60j 7/10
[58] Field of Search..............296/137 E, 137 F, 137 R, 137 C

[56] References Cited

FOREIGN PATENTS OR APPLICATIONS

| 601,776 | 2/1960 | Italy....................................296/137 E |
| 1,108,992 | 9/1955 | France...............................296/137 E |

Primary Examiner—Benjamin Hersh
Assistant Examiner—Robert R. Song
Attorney—Stevens, Davis, Miller & Mosher

[57] ABSTRACT

This control device for operating a folding head, notably of automotive vehicle, comprises alternate free and guided bows attached to the curtain, a shaped longitudinal section member associated with a longitudinal slideway and disposed on either side of the roof aperture, a plastic slide disposed on either side of each guided bow and engaging said slideway, and torsion bars interconnecting on either side of the curtain a free bow with the next guided bow, each torsion bar being secured at one end to said slide and at the opposite end to said free bow.

3 Claims, 5 Drawing Figures

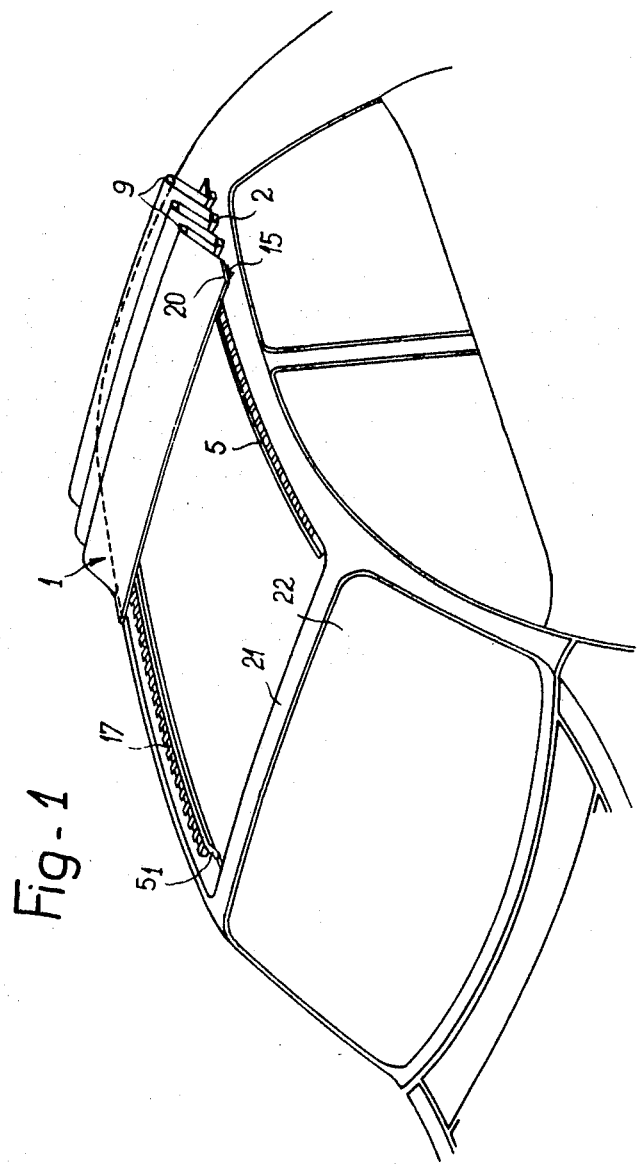

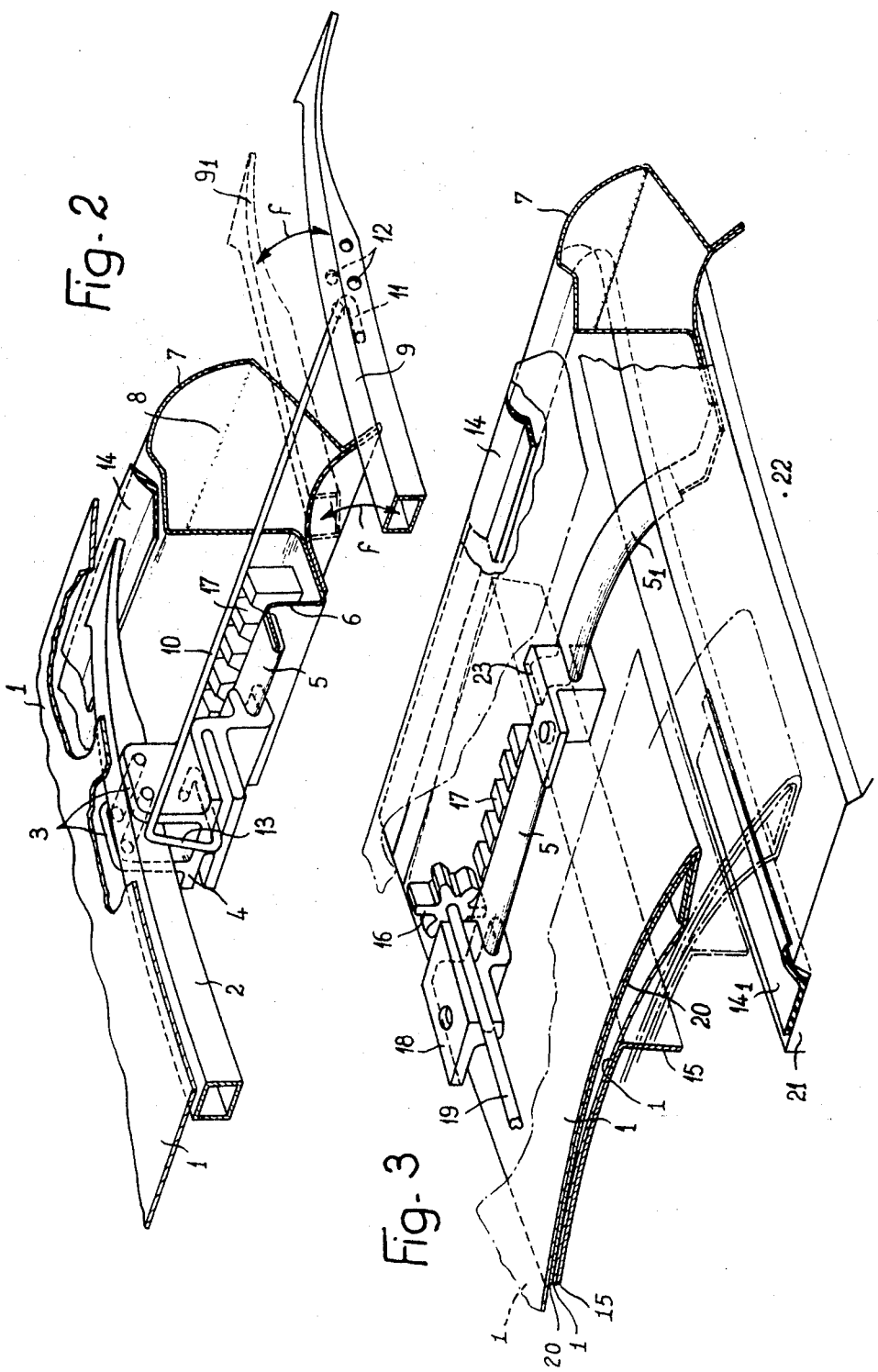

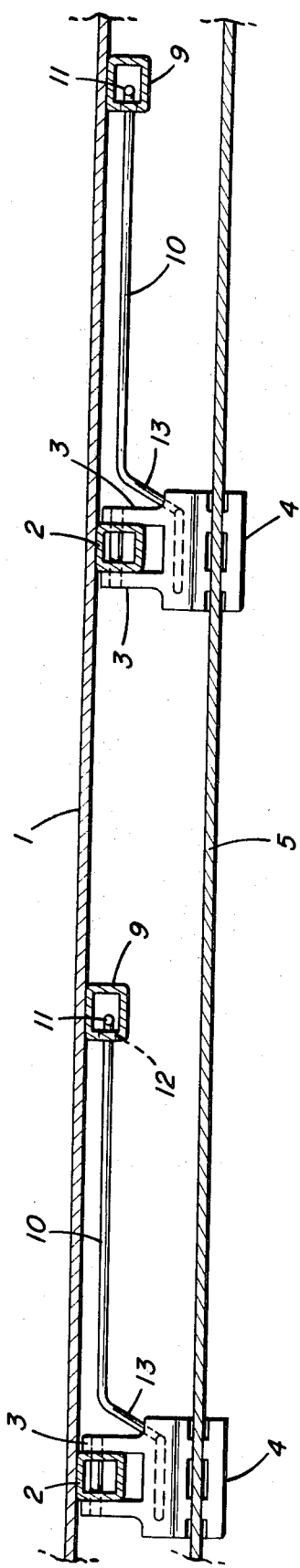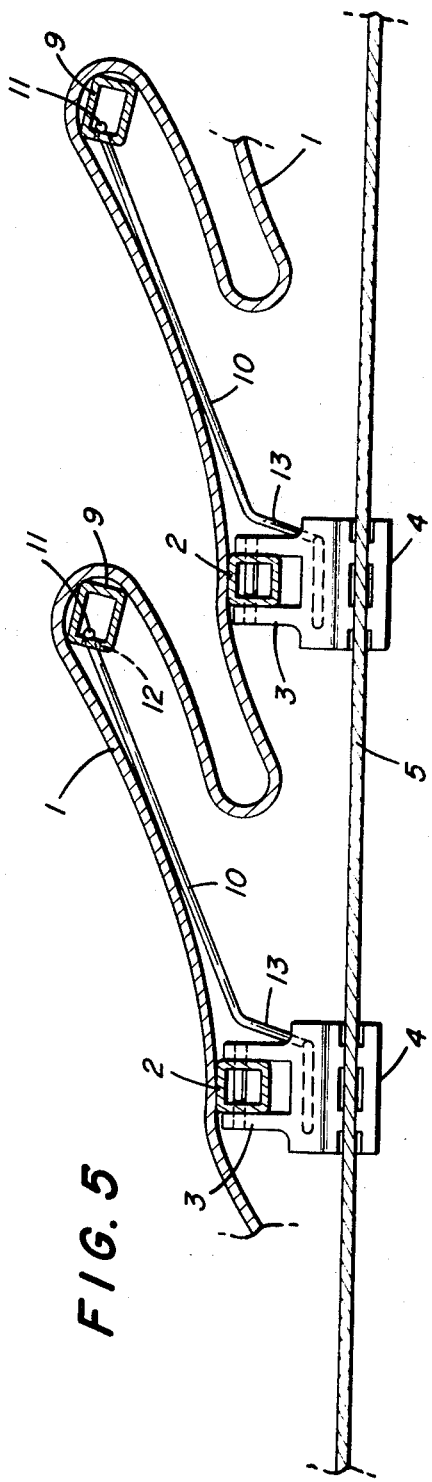

FOLDING HEAD CONTROL DEVICES

The present invention relates to a device for operating a folding head or top, notably of automotive vehicles having a roof aperture adapted to be closed by means of a folding curtain or like structure.

In installation of this character three requirements must be met:

Firstly, the folding curtain should be economically sound;
Secondly, a reliable weather tightness is absolutely necessary, especially at the front portion of the curtain, and
Thirdly, in the closed position the curtain material must be safely tensioned.

It is known to operate sliding-roof panels by means of cables guided along lateral guide rails and leading to driving means such as an electromotor or a crank-handle actuating a suitable mechanism. However, this type of control system is applicable more particularly to rigid sliding roofs.

Soft-top systems are also known wherein a head curtain or sheet of adequate material is wound or unwound manually, and held in its stowed position by suitable straps or the like; alternately, other devices are adapted to be folded symmetrically towards the middle of the roof length, thus freeing the major portion of the roof space above the passengers' heads.

However, rigid sliding roofs are objectionable in that at the most only about one-half of the vehicle roof can be uncovered or opened.

Hitherto known folding head or drop-head (convertible) systems clear the roof more completely but on the other hand their automatization is both elaborate and expensive. In fact, this car top design requires a complicated and costly control system comprising connecting and flexion means between two bows. Up to now these means required a great number of parts the manufacture and fitting of which are particularly delicate.

The front-joint weather-tightness, between the top of the windscreen frame (or the front edge of the roof) and the movable front cross member of the folding head, requires in general that said cross member exerts a substantial pressure against a rubber moulding glued to said frame. Thus, the bearing or sealing face of the front cross member must be released before actually starting the backward movement or transfer thereof. This requirement frequently leads to the provision of a two-section front cross member, with one section being guided parallel to the longitudinal centre line of the vehicle body, and the other section linked to said one section in order to act as a "jaw" therewith when unfolding and closing the top. Now the number of elements constituting this linkage and pivotal mounting is abnormally high, and the machining and assembling of their component elements constitutes a delicate operation resulting into a relatively costly construction. It is an essential object of this invention to avoid this inconvenience.

On the other hand, the problem of tensioning the folding head in its closed position was solved up to now by separating the actual tensioning phase from the transfer of the folded head. As a rule, the sheet tension is obtained by using a manually operated cam or eccentric hook. The transfer action is either manual or electrically operated. In this last instance the complicated structure of the front cross member prevents the housing of an electric motor therein, and therefore this motor has to be secured to the fixed roof structure proper.

With this object in view, the present invention provides an automatic control device for folding heads, notably of motor vehicles, which is driven from a motor and reduction-gearing unit transmitting the drive to pinions meshing with racks extending laterally on either side of the axis of displacement of the folding curtain, this device being characterized in that it comprises alternate guided and free bows, attached to the curtain covering them, a shaped longitudinal section member on either side of the roof opening, parallel to the axis of displacement of the folding curtain and rigid with the body structure of the vehicle, a longitudinal slideway mounted on each longitudinal section member, a plastic slide disposed on either side of the guided bow, rigid therewith and in siding engagement with the corresponding slideway, and torsion bars interconnecting on either side of the curtain a free bow to the next guided bow, each torsion bar being secured at one end to said slide and at the other end to the free bow in order to keep them at a substantially equal relative spacing and to have a tension sufficient to permit, during the roof opening operation controlled by the device, the pivotal movement of the free bow with said torsion bar about said guided bow, and subsequently passing over the preceding guided bow, in the roof-opening direction, when the curtain tension is slackened.

Other features characterizing this invention will appear as the following description proceeds with reference to the attached drawing illustrating diagrammatically by way of example a typical form of embodiment of the automatic folding head system of this invention. In the drawing:

FIG. 1 is a fragmentary perspective view of a vehicle equipped with a folding head according to this invention, the roof being shown in its open condition;

FIG. 2 is a perspective view with parts broken away showing one side of the device with one torsion bar ensuring the movement of a movable bow in relation to a guided bow, and FIG. 3 is another perspective view with parts broken away showing the front portion of the folding head and illustrating the driving means and the closing device of this invention.

FIG. 4 is a longitudinal sectional view of the folding head, the free bows being in their flat position.

FIG. 5 is a longitudinal sectional view of the folding head when the free bows are in an intermediate pivoted position.

In the example illustrated, FIG. 1 shows a movable folding curtain or "soft" top or head of a motor vehicle which is designated as a whole by the reference numeral 1, attached to a number of bows 2 guided by a pair of slideways 5 disposed on either side of the curtain and parallel to the longitudinal axis of the vehicle body, other bows 9 alternating with said guided bows 2 and attached to the curtain being "free" to permit their passage over the guided bows during the roof opening operation.

Referring now more particularly to FIGS. 2 and 3 of the drawing, it will be seen that the bow 2 has its ends secured to a strap-forming integral portion of a slide or guide member 4 of plastic material slidably mounted on a slideway 5. This slideway 5 is rigidly mounted to one arm 6 of a lateral shaped longitudinal section member 7 advantageously formed by folding a sheet metal blank or strip and welded to the body structure of the vehicle. The free bow 9 alternating with the guided bow 2, as shown in FIG. 2, at the rear, in relation of the normal direction of movement of the vehicle, is connected to the slide or guide member 4 of bow 2 through a torsion bar 10 having a bent end 11 engaged in a hole 12 of bow 9 and its other bent end 13 securely pivotally attached to said slide or guide member 4. This torsion bar keeps the two bows 2 and 9 at a constant relative distance and is tensioned in the closed roof position.

When the folding head or roof is closed, the free bows 9 are in a substantially flat position with respect to each other, as shown in FIG. 4, and the tortion bars 10 are substantially parallel to the slideway 5.

When the roof is being opened, the guided bows 4 are moved by driving pinion 16 toward the rear end of the roof opening, and the torsion bars 10 lift in succession, during the operation, the free bows 9 by causing same to pivot about the next guided bow 2, as shown by the arrows f and the dash lines $9_1$ denoting the contour of the free bow, as shown in FIG. 3. When the tension of the material constituting the curtain 1 is slackened, the torsion bar 10 permits the passage of the free bow 9 over the preceding guided bow 2 in the roof opening direction, as illustrated in FIG. 5 showing the intermediate pivoting state and in FIG. 1 the final position of the curtain.

A rubber moulding or weather strip 14 is disposed between the curtain 1 and the longitudinal side member 7 to seal the joint in the closed position of the device.

The front portion of the folding head as illustrated in FIG. 3 consists essentially of a metal cross member 15 having secured thereto the power means for actuating this head (for instance an electric-motor and reduction-gearing unit, not shown in the drawing) which drives on either side of the roof a pinion 16, preferably of suitable plastic material, in constant meshing engagement with a corresponding fixed lateral rack 17. A plastic slide 18 acts both as a bearing to the shaft 19 of pinion 16 and as guide along slideway 5. The head curtain 1 is sandwiched between a sheet metal member 20 and said cross member 15, the latter having the curtain end secured thereto for example by means of screws (not shown).

With this assembly the folding curtain 1 can be transferred on the slides 5, folded and closed. The non-reversing characteristic of the motor and reduction gearing unit makes it possible to stop the curtain in any desired position and makes the assembly tamper-proof in the closed position.

In order to promote an improved weather tightness along the upper cross member 21 of the windscreen frame 22 a plastic slide 23 is connected to the movable cross member 15 rigid with the curtain 1. This slide 23 is adapted, during the head closing movement, to slide on the end portion $5_1$ of slideway 5 which is curved downwards and forwards of the vehicle so as to be subsequently secured to the aforesaid upper cross member 21 of the windscreen frame 22. Under these conditions the slide 23 permits the tilting of the assembly comprising the sheet member 20, curtain 1 and cross member 15 at the end of the roof closing movement, as illustrated in dash and dot lines in FIG. 3, in order to seal the joint along the cross member 21 of the frame by means of a transverse rubber moulding $14_1$ and also to complete the proper tensioning of curtain 1.

Although a specific form of embodiment of the folding head structure of this invention has been described hereinabove and illustrated in the accompanying drawing, it will readily occur to those skilled in the art that various modifications and changes may be brought thereto without departing from the spirit and scope of the invention as set forth in the appended claims.

What is claimed as new is:

1. A device for opening and closing a folding roof covering a roof aperture of an automotive vehicle having an automatically controlled folding roof curtain, comprising a motor and reduction-gearing unit, pinions driven by said unit and in constant meshing engagement with fixed racks extending laterally on either side of the longitudinal axis of the curtain, guided and free bows alternately disposed along the roof curtain and in a direction generally perpendicular to said longitudinal axis thereof and secured to the curtain, a shaped longitudinal section member disposed on either side of the roof aperture, parallel to the axis of movement of said curtain and rigid with the structure of the vehicle, a longitudinal slideway rigidly mounted on each longitudinal section member, a slide rigidly mounted on either side of each guided bow, each slide being adapted to engage a corresponding slideway, and torsion bars interconnecting on each side of said curtain each free bow and an adjacent guided bow, each torsion bar being pivotally attached at one end to a slide of said guided bow and at the opposite end to said free bow so as to keep said guided bow and said free bow everywhere at a substantially equal relative spacing, the pivotal attachment of said torsion bars to said slides including means for biasing said torsion bars against said slides when the curtain covers the roof aperture whereby the tension produced in said torsion bars is sufficient to cause a pivotal movement of the free bows about the guided bow slides to which they are attached, said movement lifting portions of said roof curtain, and said torsion bars having such a shape and are so pivotally attached to said slides so that the free bow to which a pair of said torsion bars is attached is capable of passing over the guided bow rearwardly adjacent said free bow when the roof curtain is opened.

2. A device according to claim 1, further comprising a movable cross member fixed at the front end of said folding curtain and supporting said motor and reduction-gearing unit having a vertical output shaft for driving said rack-engaging pinions which have horizontal axes, other guides engaging said longitudinal slideways and acting as bearings for the shafts of said pinions, and further guides engaging said longitudinal slideways, said further guides being rigid with and disposed ahead of said cross member.

3. A device according to claim 2, wherein said slideways have their front ends curved downwards and adapted to coact with said further guides mounted ahead of said cross member, and a curtain end assembly attached to said cross member, said curtain end assembly adapted to compressively engage a moulding strip on the upper cross member of the windscreen frame of the vehicle when the roof curtain is in the closed position.

* * * * *